Nov. 26, 1968   W. A. WESCHLER   3,413,651
FILTER SYSTEM FOR RECORDING
Filed July 18, 1966

INVENTOR.
WILLIAM A. WESCHLER
BY
ATTORNEY

United States Patent Office 3,413,651
Patented Nov. 26, 1968

3,413,651
FILTER SYSTEM FOR RECORDING
William A. Weschler, Sparkill, N.Y., assignor to Technicon Corporation, a corporation of New York
Filed July 18, 1966, Ser. No. 565,844
4 Claims. (Cl. 346—33)

ABSTRACT OF THE DISCLOSURE

A recording system includes a recorder for recording a signal having a cyclical noise component, and an input filter network having a capacitance, which is initially disposed in a low time constant configuration in conjunction with the initial provision of the cyclically noisy signal thereto, to permit the capacitance of the network to rapidly charge or discharge to follow the signal; and subsequently a first portion of the capacitance of the network is disposed into a high time constant configuration, and finally the remaining portion of the capacitance of the network is disposed into a high time constant configuration at a time interval which is a fraction of the period of the cyclical noise after the first portion has been charged, to cause the capacitance of the network to thereupon substantially instantaneously reach a steady state charge.

---

This invention relates to signal recording, and especially to the recording of a plurality of sequentially provided signals.

This invention has utility in many fields, as will be obvious to those skilled in such fields, wherein it is desired to record a plurality of sequentially provided signals. However, the following discussion of the invention will concern itself with automatic analysis apparatus.

This invention is related to the invention disclosed in U.S. Patent Aplication Ser. No. 554,083 of Edwin C. Whitehead, Milton H. Pelavin and William A. Weschler, filed May 31, 1966, and assigned to a common assignee, to which reference may be made for a more complete discussion of the background of sequential sample analysis. Briefly, signals responsive to the respective concentrations of one or more constituents of interest in one or more samples are sequentially supplied to a single pen recorder for recording. Frequently, there is a rapid change in magnitude between successive signals. Sometimes this is due to returning the pen to zero to provide a demarcation between immediately adjacent signals. Other times this is simple due to an inherently high or low signal following an inherently low or high signal. Since there is customarily noise in the fluid system, it is desirable and customary to provide a filter network to heavily filter the signals provided to the recorder, so as to record a relatively flat, average value trace. However, if the time constant of the filter network is adequately long to provide heavy filtering, and if the time interval during which the signal is to be recorded is relatively short, the capacitance in the network may be unable to charge or discharge to the desired value within the time available, let alone charge to the desired value and then remain there so as to provide a flat trace indicative to the viewer that a steady state condition has been reached, both chemically and electrically. To overcome this bar to high speed operation, Whitehead et al. have taught the use of a filter network having two configurations. Initially, the network is configured so that it has a relatively short time constant and its capacitance is able to charge or discharge rapidly, to closely follow the applied signal voltage. Subsequently, the network is configured so that it has a relatively long time constant and subjects the applied signal voltage to a heavy filtering action so that the recorder traces a relatively flat trace.

It has been discovered that one of the major causes of noise in the fluid systems of these automatic analysis apparatuses is the periodic removal of the rollers from the pump tubes of the peristaltic type pumps which are used to transmit fluids through the apparatus. Peristaltic type pumps are illustrated in U.S. Patent No. 2,935,028 issued to Andres Ferrari on May 3, 1960. Thus the noise has a large cyclical component. If the network of Whitehead et al. is changed from its short time constant configuration to its long time constant configuration at a peak value of this cyclical noise, the heavily filtered signal provided by the network to the recorder will require a significant time interval to reach a flat steady state value. This time interval, of course, will be much shorter than that required by a network having only a long time constant configuration.

It is, therefore, an object of this invention to provide a method, and an apparatus therefor, for minimizing the interval required for the filter network to deliver a steady state signal from an input signal having a cyclical noise component.

A feature of this invention is the initial disposition of the capacitance of the network into a low time constant configuration in conjunction with the initial provision of the cyclically noisy signal thereto, to permit the capacitance of the network to rapidly charge or discharge to follow the signal; the subsequent disposition of a first portion of the capacitance of the network into a high time constant configuration, and the final disposition of the remaining portion of the capacitance of the network into a high time constant configuration at a time interval which is a fraction of the period of the cyclical noise after the first portion has been charged, to cause the capacitance of the network to thereupon substantially instantaneously reach a steady state charge.

These and other objects, features and advantages of this invention will become apparent from the following specification taken in conjunction with the accompanying drawing in which:

FIG. 1 is a schematic electrical circuit diagram of an embodiment of this invention;

Figure 2:
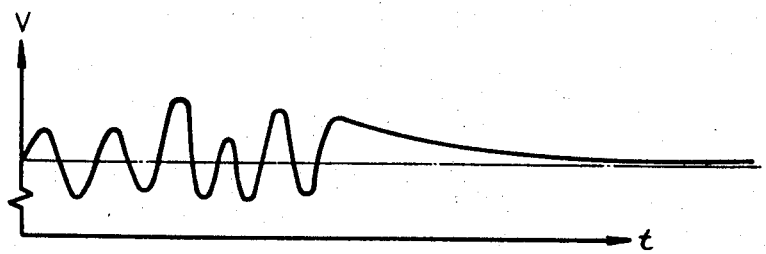
FIG. 2 is a curve of signal voltage v. time of the improved prior art network.
Figure 3:
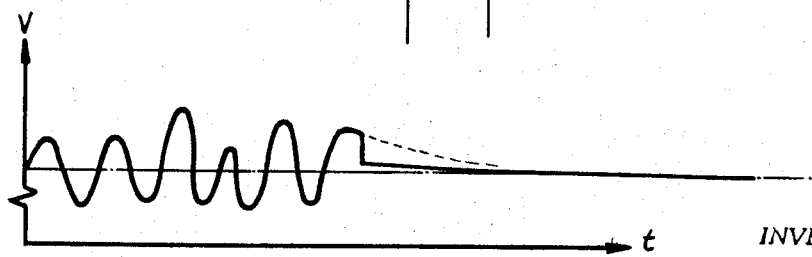
FIG. 3 is a curve of signal voltage v. time of the network of the instant invention.

The filter network 10 has an input terminal 12 and a ground terminal 14 across which the successive signals are received, and an output terminal 16 at which the output signal is delivered to a single pen recorder 18. The network includes an operational amplifier 20 having an input terminal 21 coupled to the terminal 12, and a signal output terminal 22. This amplifier provides an amplified output signal across a much lower impedance than its input impedance. A resistor 24 and a capacitor 26 are assumed to exist at the amplifier input, but they have a negligible time constant. The amplifier is also provided with the customary feed-back loop 28. The input signal to the amplifier may, for example, but not by way of limitation, be 0 to 500 millivolts, full scale; the output signal from the amplifier may, for example, but not by way of limitation, be 0 to 5.0 volts, full scale. The recorder 18, which may be a millivolt null balance recorder, has a signal input terminal 30 which is coupled to the network output terminal 16, a reference signal input terminal 32, and a ground terminal 34.

A resistor 36, a resistor 38 having a sliding tap 40, and a resistor 42 are connected in series between the amplifier signal output terminal 22 and the ground 14. A resistor 46, and a resistor 48 having a sliding tap 50 are also connected in series between the output terminal 22 and the ground 14.

The tap 40 is connected by a junction 52 to the normally closed contact 54NC of a relay 54R, and to the normally closed contact 56NC of a relay 56R.

The junction 58 of the resistor 44 and 46 is connected by a junction 60 to the normally open contact 54NO of the relay 54R, and to the normally open contact 56NO of the relay 56R. A capacitor 62 has one plate connected to the fixed contact 54F of the relay 54R and its other plate connected to ground. A capacitor 64 has one plate connected to the fixed contact 56F of the relay 56R and its other plate connected to ground.

The resistor 48 serves as a sensitivity control and has a resistance which is much less than that of the resistor 44 or 46, for example, but not by way of limitation, 10 kilohms. Exemplary values of the components, which are not to be taken as limitative, are 2.55 kilohms for R36, 500 ohms for R38, 2.55 kilohms for R42, 221 kilohms for R44, 221 kilohms for R46, 56 microfarads for C62, and 56 microfarads for C64.

A line 70 is pulsed cyclically with each sample input. As each sample occurs, line 70 is deenergized for a period to allow the capacitors to charge to the average steady state value. Then line 70 is energized to allow the capacitors to switch to the long time constant circuit and smooth the recorder signal. The pulse on line 70 actually is obtained from a timer which is phased to the hydraulic occurrence of the sample at the detector. The line 70 is coupled to a means 72 for energizing the relay 54R. The line 70 is also coupled to a delay device 74 which is coupled to a means 76 for energizing the relay 56R. The delay of the device 74 should be substantially one-half the period of the fluid system noise. In one commercial embodiment of a pump, a roller leaves the pump tubes every two seconds, therefore, for use with such a pump, the delay of the device 74 would be substantially one second.

The tap 40 is adjustable to balance the resistors 36 and 42 so that the ratio of the resistances between the terminal 22 and the tap 40, and the tap 40 and the floating ground 14, will be identical to the ratio of resistances between the terminal 22 and the junction 58, and the junction 58 and the floating ground 14. Thus the voltages at the tap 40 and at the junction 58 should be identical. When the capacitors 62 and 64 are connected to the tap 40, they will have a time constant which is relatively low, in the order of 0.2 second. When the capacitors are connected to the junction 58, they will have a time constant which is relatively high, in the order of 15 seconds.

In operation, initially, the relays 54R and 56R are deenergized and the capacitors 62 and 64 are coupled to the tap 40, so that the network is in its low time constant configuration. The capacitors rapidly charge or discharge to follow the voltage signal provided at the tap 40. Subsequently, line 70 is pulsed to energize the relay 54R to switch the capacitor 62 to the junction 58. After the delay provided by the device 74, the relay 56R is energized to switch the capacitor 64 to the junction 58. The network is now in its high time constant configuration, and heavily filters the signal to the recorder 18.

As a close approximation, the capacitances of the capacitors 62 and 64 are made equal, and the delay between the switching of the capacitors from the low time constant configuration to the high time constant configuration is made one-half the period of the noise cycle. Assuming the worst case, the capacitor 62 is switched from low to high at a positive peak of a noise cycle. This capacitor now slowly discharges towards the average or steady state value of the voltage signal. Subsequently, the capacitor 64, which has followed the noise cycle, and is now, one-half a noise cycle later, at the negative peak of this noise cycle, is switched from low to high and slowly discharges towards the average value of the signal. Assuming that the capacitor 62 has not yet discharged significantly, and that the negative and positive peaks are opposite and equal, the voltage differences from the average signal on the capacitors will be equal and opposite and will cancel out at the junction 58. In actual practice, if the voltage change of the firstly switched capacitor is significant, the secondly switched capacitor may be made of slightly smaller capacitance so that at its time of switching it will have a charge equal to the firstly switched capacitor's instantaneous charge. Alternatively, the secondly switched capacitor may be switched slightly earlier than one-half the noise cycle so that at its time of switching it will have a charge equal to the firstly switched capacitor's instantaneous charge.

A single network 10 may be utilized when the sequential signals are provided by a single channel. Additional networks 10' may be provided when the sequential signals are provided by additional channels, and the recorder 18 is cyclically and sequentially coupled to all of the output terminals 16, 16'. When the recorder is coupled to one channel, its network may be in the high time constant configuration while others of the networks may be in the low time constant configuration.

What is claimed is:

1. Apparatus comprising: signal input means; signal output means; network means, including a first capacitor means and a first switching means therefor and a second capacitor mean's and a second switching means therefor, coupled between said signal input means and said signal output means; said first switching means being adapted to connect said first capacitor means within said network means in a first configuration wherein said first capacitor means has a relatively short time constant and in a second configuration wherein said first capacitor means has a relatively long time constant; said second switching means being adapted to connect said second capacitor means with said network means in a first configuration wherein said second capacitor means has a relatively short time constant and in a second configuration wherein said second capacitor means has a relatively long time constant; and control means coupled to said first and second switching means, for initially causing said first and second switching means to dispose said first and second switching means in their respective first configurations, for subsequently causing said first switching means to dispose said first capacitor means in its second configuration and after a predetermined interval of time for causing said second switching means to dispose said second capacitor means in its second configuration; wherein said network means includes: a first potential divider having one end coupled to said signal input means, the other end coupled to a voltage reference and having an intermediate terminal; a second potential divider having one end coupled to said signal input means, the other end coupled to said ovltage reference, a first intermediate terminal, and a second intermediate terminal coupled to said signal output means; said first capacitor means having one plate coupled to said voltage reference and the other plate coupled to a moving contact of said first switching means which has a first fixed contact coupled to said intermediate terminal of said first divider and a second fixed contact coupled to said first intermediate terminal of said second divider, and said second capacitor means having one plate coupled to said voltage reference and the other plate coupled to a moving contact of said second switching means which has a first fixed contact coupled to said intermediate terminal of said first divider and a second fixed contact coupled to said first intermediate terminal of said second divider.

2. Apparatus according to claim 1 wherein the impedance ratios of said dividers are arranged to provide the same voltage at both of said terminals.

3. Apparatus comprising: signal input means; signal output means; network means, including a first capacitor means and a first switching means therefor and a second capacitor means and a second switching means therefor, coupled between said signal input means and said signal output means; said first switching means being adapted to connect said first capacitor means within said network means in a first configuration wherein said first capacitor means has a relatively short time constant and in a second configuration wherein said first caacitor means has a relatively long time constant; said second switching means being adapted to connect said second capacitor means with said network means in a first configuration wherein said second capacitor means has a relatively short time constant and in a second configuration wherein said second capacitor means has a relatively long time constant; and control means coupled to said first and second switching means, for initially causing said first and second switching means to dispose said first and second switching means in their respective first configurations, for subsequently causing said first switching means to dispose said first capacitor means in its second configuration and after a predetermined interval of time for causing said second switching means to dispose said second capacitor means in its second configuration; a recording means, and additional switching means, and wherein a plurality of sets of said signal input, signal output and network means are provided, one set for each signal provided in a cycle, said additonal switching means being adapted to sequentially and cyclically couple the signal output means of each of said sets to said recording means at which time the companion first and second capacitor means of said set are disposed in their respective second configurations.

4. Apparatus according to claim 3 wherein when the first and second capacitor means of one set are disposed in said second configuration, the first and second capacitor means of at least another set are disposed in said first configuration.

References Cited

UNITED STATES PATENTS 2,619,534   11/1952   Payne.

RICHARD B. WILKINSON, *Primary Examiner.*

EDITH C. SIMMONS, *Assistant Examiner.*